Figure 1:
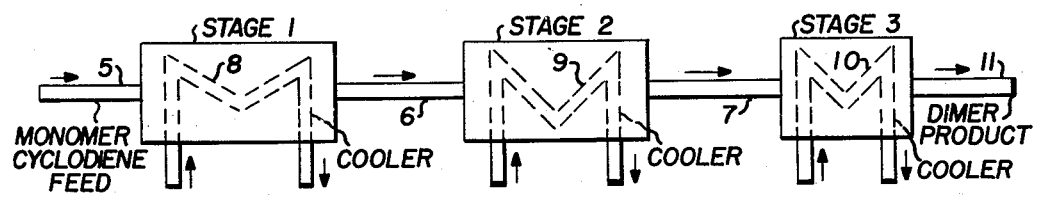

Nov. 12, 1957     J. F. JOHNSON ET AL     2,813,135

MULTI-STAGE CYCLODIENE DIMERIZING PROCESS

Filed Feb. 8, 1955

John F. Johnson
Harold W. Scheeline     Inventors

By *Henry Clark*     Attorney

United States Patent Office 2,813,135
Patented Nov. 12, 1957

2,813,135

MULTI-STAGE CYCLODIENE DIMERIZING PROCESS

John F. Johnson, Plainfield, and Harold W. Scheeline, Elizabeth, N. J., assignors to Esso Research and Engineering Company, a corporation of Delaware Application February 8, 1955, Serial No. 486,818

5 Claims. (Cl. 260—666)

This invention relates to a controlled dimerization of a cyclodiene monomer in the liquid phase to obtain a higher quality dimer product, i. e., containing a minimum of higher polymer.

The cyclodiene monomers, e. g. cyclopentadiene, methyl-, or ethyl-cyclopentadiene, when concentrated dimerize spontaneously with liberation of heat. For convenience and safety, it is desirable to handle, store and ship these materials as dimers or as mixtures of dimers and codimers.

In the past the dimerization of dilute cyclodiene monomers has generally been carried out batchwise in a large drum or tank with or without cooling coils to remove the heat of dimerization. This method of operation results in relatively little higher polymer formation. The batch process cannot be applied to large quantities of highly concentrated monomer, however, since the large heat of dimerization would cause a runaway reaction in storage tank. Therefore, concentrated monomers must be dimerized in a continuous process. This has generally been carried out in a single large drum equipped with cooling coils. While this method is satisfactory for a low conversion of monomer to dimer, unduly large amounts of higher polymers, i. e., trimer, tetramer and higher polymers are formed under high conversion conditions. The formation of these polymers is undesirable since they are difficult to crack back to the monomer. Another undesirable result is the formation of copolymers of the cyclodiene monomers with acyclic diene monomers present as impurities. These copolymers are also difficult to crack and cannot be removed from the final dimerized product as can the unpolymerized acyclic monomers.

It is an object of the present invention to obtain a satisfactory or maximum conversion of the cyclodiene monomer to the dimer with minimum formation of higher polymers or of copolymers of cyclodienes with acyclic diene monomers present as impurities.

In the present invention were discovered steps useful for minimizing higher polymer and copolymer formation at high dimer conversion even when the feed stock of cyclodiene monomer is highly concentrated and when the conversion is carried out in a continuous or semi-continuous manner.

A control factor of primary importance in the dimerization of a concentrated cyclodiene monomer liquid is the use of steps and means for subjecting the monomer to progressive dimerization over a period of time until maximum conversion is obtained while preventing repeated contact of the dimer with concentrated monomer under conditions which favor the formation of higher polymer. This solution of the problem thus involves dimerization in stages.

The use of separate vessels or zones for each stage to provide adequate agitation and proper temperature control is one method for increasing the efficiency of operation. Instead of using separate vessels, a vessel may be provided with means for obtaining separate compartments or reaction zones to provide the separate stages, or portions of a feed material to be treated may be passed through a continuous coil in separate liquid masses or slugs.

In the drawing, the process is illustrated in terms of a 3-stage dimerization system although it will be understood that any number of stages can be used. By providing the separate stages, adjustment of the conditions, time, temperature, and pressure can be made relative to the monomer and dimer concentrations in each stage.

EXAMPLE 1

Referring to the drawings, Fig. 1, an 85% to 100% concentrated cyclopentadiene monomer is fed serially through stages 1, 2 and 3 through the feed line 5 and the intervening transfer lines 6 and 7. Each of the three stages is provided with a separate cooling coil or heat exchange means 8, 9 and 10. The final dimerized product is withdrawn from the final stage through line 11.

To test the use of multiple stages, experimental runs were made in a single stage reactor at a series of conversion levels to simulate the conditions existing in each of a number of stages. In these runs, highly concentrated cyclopentadiene monomer liquid was fed continuously to an overflow reactor operating under reflux conditions and at atmospheric pressure. The apparatus was arranged to minimize any reaction of the cyclopentadiene monomer before entering or after leaving the reactor. The temperature was controlled by refluxing vaporized monomer and agitation was provided to maintain equilibrium conditions. The dimerized products were analyzed for monomer, dimer and polymer. The monomer conversions thus determined were checked by calculation from the boiling points of the equilibrium reaction mixtures. The polymer content was based on the freezing point of the dimer product stripped free of unreacted monomer. During this work a close check was obtained on the cryoscopic constant of the cyclopentadiene dimer using pure cyclopentadiene trimer as the known impurity. A polymer residue from the dimerization giving a molecular weight value of 188 indicated the polymer to be trimer chiefly.

Experimental data for the conversion values and product compositions for each of five runs at different conversion levels are summarized in the following table:

Table I

| Run | Equilibrium, B. P., °C. | Conversion, Weight Percent | Product Composition | | | Contact Time, Hours |
|---|---|---|---|---|---|---|
| | | | Dimer | Polymer | Monomer | |
| 1 | 63 | 66.0 | 65.9 | 0.1 | 34.0 | 4.2 |
| 2 | 100 | 90.0 | 88.3 | 1.6 | 10.0 | 4.8 |
| 3 | 120 | 95.0 | 90.0 | 5.0 | 5.0 | 7.2 |
| 4 | 133 | 96.5 | 87.7 | 8.8 | 3.5 | 9.4 |
| 5 | 140 | 97.5 | 86.1 | 11.4 | 2.5 | 7.2 |

A study of Table I shows that a substantial conversion of monomer (60–80%) can be obtained in a single stage with only a minor amount of higher polymer formation. However, if higher conversions (above about 90%) are attempted in a single-stage reactor, the amount of higher polymer formed becomes excessive. These data demonstrate that if high over-all conversion of monomer to dimer is required, several dimerization stages should be used with only a minor part of the dimerization occurring in the later high conversion stages where the high polymer formation is largest.

Figure 2:
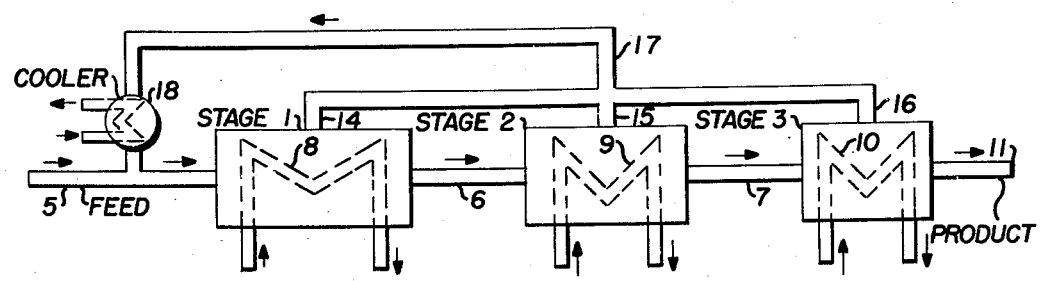

Fig. 2 illustrates how in conjunction with a multistage dimerization system other advantages can be realized, such as savings in vessel volume, selection of temperatures most suited for each stage, and adjustment of concentrations most suited for each stage.

In the operation shown in Fig. 2, as in the operation of Fig. 1, a three-stage dimerization system is shown, although any number of stages can be used. The vessels 1, 2 and 3 are in series. The intial feed line is 5. The interstage transfer lines are 6 and 7. Heat exchange means for each of the three stages are 8, 9 and 10. The dimerized product is withdrawn from the final stage through line 11. In Fig. 2 each stage is provided with a separate vapor removal line 14, 15 and 16. A portion of the vapors removed from each stage may be partially condensed and refluxed, but it is possible to remove any desired proportion of the vapors from each of the stages for return through a common line 17 and reflux condenser 18 to the feed line 5 in order to maintain certain ratios of the cyclopentadiene monomer and dimer in each stage. The results which can be obtained by using a multistage operation as indicated in Figure 2 are illustrated in Table II, below. These results are derived from the experimental data given in Table I.

Table II.—*Multistage dimerization of cyclopentadiene*

CONTROLLED TEMPERATURES AND CONDENSATION RATE FOR EACH STAGE

|  | Stage | | | |
| --- | --- | --- | --- | --- |
|  | I | II | III | Total |
| Temperature, ° C | 53 | 78 | 121 |  |
| Conversion Level, Percent [1] | 60 | 84 | 95 | 95 |
| Percent Feed Converted to Dimer in Stage | 60 | 24 | 11 | 95 |
| Holdup Time, Hrs.[1] | 4.6 | 1.6 | 1.0 |  |
| Concentration, Weight Percent: |  |  |  |  |
| Monomer | 55 | 23 | 5 |  |
| Dimer | 45 | 77 | 95 |  |
| Relative Dimerization Rate | 120 | 23 | 1 |  |
| Relative Polymer Formation Rate | .25 | .19 | .05 |  |
| Polymer Rate Percent of Dimerization | .21 | .83 | 5.0 |  |
| Polymer Formed in Each Stage, percent [1] | .13 | .20 | .55 | .83 |

[1] Based on fresh feed.

EXAMPLE 2

In an example of an operation conducted using the system of Fig. 2, 100 lbs. of liquid cyclopentadiene monomer is fed with 100 lbs. of recycled monomer forming the subsequent feed to the first stage reaction zone. In the first stage with a limited contact time of about 3 to 4 hours at 50° C. to 60° C. about 60% conversion is obtained. After withdrawing 65 lbs. of the monomer vapor for recycling, the remaining 60 lbs. of dimer and 75 lbs. of monomer are transferred to a second stage. In the second stage a higher conversion temperature of 60° to 100° C. is maintained for between 1 and 3 hours to bring the conversion level up to about 84%. 25 lbs. of the cyclopentadiene monomer distilled overhead from the second stage can be recycled to the first stage leaving a residue of 26 lbs. of unconverted monomer to be transferred with 86 lbs. of dimer to the third stage. In the third stage operated at 100° to 140° C. and 1.0 hr. holdup a 95% conversion is obtained and about 10 to 15 lbs. of the unconverted monomer is withdrawn overhead for recycling to the first stage.

It will be understood that the hold-up or contact times given in the specific examples are not fixed but may be varied. The time depends on variable factors such as agitation, amount of material treated, etc.

In the type of operation described under Example 2, above, the total polymer formation would be 0.83% as compared with 5% or more if the 95% conversion had been conducted in a single stage. A three-stage operation without the controlled return of condensate to the first stage in the manner described would produce about 1.12% higher polymer on a comparable basis. With the system shown in Fig. 2 the dimerization can be carried out in each stage under separate reflux conditions.

A comparison of the monomer and dimer concentrations present in each stage of operations illustrated in Figs. 1 and 2 shows that the monomer concentration in the first two stages of the Fig. 2 operation are considerably higher than in the first two stages of Fig. 1 operation on account of the recycle of monomers back to the first stage in Fig. 2. These higher monomer concentrations in the early stages result in a decrease of total polymer formation thus giving a desirable advantage. This decrease in polymer formation for the Fig. 2 operation is shown in the summarized comparative data of the following Table III.

Table III.—*Reduction in polymer formation by recycling monomer condensate back to the 1st stage of a 3-stage dimerizer*

FIG. 1 OPERATION—INDIRECT COOLING OF LIQUID; NO RECYCLE OF MONOMER TO 1ST STAGE

| Stage No. | I | II | III | Total |
| --- | --- | --- | --- | --- |
| Conversion Level [1] | 60 | 84 | 95 |  |
| Percent of Feed Converted in Stage | 60 | 24 | 11 | 95 |
| Concentrations, Wt. Percent: |  |  |  |  |
| Monomer | 40 | 16 | 5 |  |
| Dimer | 60 | 84 | 95 |  |
| Polymer Formed in Each Stage, Wt. Percent of Feed | .06 | .19 | .62 | .87 |

FIG. 2—REFLUX COOLING WITH RETURN OF MONOMER CONDENSATE TO 1ST STAGE

| Conversion Level [1] | 60 | 84 | 95 |  |
| --- | --- | --- | --- | --- |
| Percent of Feed Converted in Stage | 60 | 24 | 11 | 95 |
| Concentrations, Wt. Percent: |  |  |  |  |
| Monomer | 55 | 23 | 5 |  |
| Dimer | 45 | 77 | 95 |  |
| Polymer Formed in Each Stage, Wt. Percent of Feed | .04 | .09 | .62 | .75 |

[1] Based on fresh feed.

By carrying out the dimerization in district stages, whereby a limited amount of dimerization is permitted in each stage, and the amount of dimerization is diminished in each succeeding stage, there is not only a reduction of undesired higher polymers but the formation of codimer contaminants may be controlled. Also, there can be a savings in vessel capacity.

It should be noted that vessel capacity is an important consideration because the dimerization requires long periods of soaking, of the order of at least 4 hours in a 3-stage process, and generally above 1 hour in any initial stage of a multistage process. For this reason, one could not operate the desired staging in any means which allows rapid throughflow, such as a conventional fractionation tower.

The invention described is claimed as follows:

1. In a process of dimerizing a concentrated cyclopentadiene monomer feed wherein the monomer containing feed is maintained at elevated temperatures for a period of time, the improvement which comprises conducting said dimerization in at least two stages, controlling the heat and time of dimerization in the first stage to limit the amount of dimer formation to not more than about 90% the time of dimerization in said first stage being above one hour, and further controlling dimerization in each succeeding stage by decreasing the time of dimerization whereby formation of trimer and higher polymers is minimized.

2. A process in accordance with claim 1 wherein the amount of dimer formed is substantially less in each succeeding stage.

3. In the process of claim 1, holding the cylodiene monomer in the initial stage for a period of 3 to 5 hours, then holding the reaction mixture product in a succeeding stage for about 1 to 3 hours.

4. In the process of claim 1, removing monomer by vaporization in a succeeding stage to decrease the proportion of monomer to dimer therein and passing the removed monomer back to the initial stage to maintain the liquid monomer concentration therein.

5. In the process of claim 1, cooling said initial stage zone to maintain a reaction temperature in the range of 50° to 100° C. and cooling in the subsequent stages to maintain the temperatures therein between 100 and 140° C.

References Cited in the file of this patent

UNITED STATES PATENTS

| | | |
|---|---|---|
| 2,543,016 | Grosse | Feb. 27, 1951 |
| 2,582,920 | Businger et al. | Jan. 15, 1952 |
| 2,636,055 | Jones | Apr. 21, 1953 |